(12) United States Patent
Nishioka

(10) Patent No.: US 8,776,513 B2
(45) Date of Patent: Jul. 15, 2014

(54) FLUID-PRESSURE ACTUATOR UNIT

(75) Inventor: Shiro Nishioka, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 946 days.

(21) Appl. No.: 12/923,853

(22) Filed: Oct. 12, 2010

(65) Prior Publication Data

US 2011/0088797 A1    Apr. 21, 2011

(30) Foreign Application Priority Data

Oct. 20, 2009    (JP) .................................. 2009-241187

(51) Int. Cl.
*F15B 11/08*    (2006.01)

(52) U.S. Cl.
USPC ............................................. 60/478; 91/442

(58) Field of Classification Search
USPC ............... 60/464, 477, 478; 91/426, 441, 442
See application file for complete search history.

(56) References Cited

U.S. PATENT DOCUMENTS 7,296,669 B2 *    11/2007    Quehenberger et al. ........ 60/478

FOREIGN PATENT DOCUMENTS

JP    2006-105226 A    4/2006

* cited by examiner

*Primary Examiner* — Thomas E Lazo
(74) *Attorney, Agent, or Firm* — Rabin & Berdo, P.C.

(57) ABSTRACT

A fluid-pressure pump 2 rotated by an electric motor 9 drives a fluid-pressure cylinder 3. A discharge flow restrictor 15 is provided in a discharge passage 12 through which a working fluid from the fluid-pressure pump 2 is supplied to fluid-pressure cylinder 3. A pilot-pressure-operated shut-off valve 4 changes over a connecting position A at which the discharge passage 12 between the discharge flow restrictor 15 and the fluid-pressure cylinder 3 is connected to the tank 10 and a shut-off position B at which the discharge passage 12 is disconnected from the tank 10, in response to a pressure P1 in the discharge passage 12 between the discharge flow restrictor 15 and the discharge port 24, thereby enabling a change-over between a loaded mode and an unloaded mode assumed at an fluid-pressure actuator unit 1 in response to an operation of the fluid-pressure pump 2.

9 Claims, 5 Drawing Sheets

FLUID-PRESSURE ACTUATOR UNIT

FIELD OF THE INVENTION

This invention relates to a fluid-pressure actuator unit used, for example, to support a blade assembly of a lawn mower in an operating position and to lift the blade assembly to a lifted position as required.

BACKGROUND OF THE INVENTION

A lawn mower comprises, for example, a vehicle body, a blade assembly, and an actuator. The blade assembly is supported by the mower vehicle body via a floating mechanism so as to be able to lift out of and drop into an operating position in response to an external force exerted thereon. The actuator lifts the blade assembly from the operating position to a lifted position and keeps it in the lifted position. The actuator may be provided in the form of a fluid-pressure actuator unit into which an electric motor, a fluid-pressure pump, and a fluid-pressure cylinder are integrated.

JP2006-105226A, published by the Japan Patent Office in 2006, proposes a fluid-pressure actuator unit comprising an electric motor, a fluid-pressure pump, a fluid-pressure cylinder, and an operation check valve. The fluid-pressure pump is a double-discharge type, driven by the electric motor, and discharges pressurized fluid to drive the fluid-pressure cylinder to extend or contract. The operation check valve operates in response to a discharge pressure of the fluid-pressure pump so as to supply the discharged fluid to a corresponding fluid-pressure chamber in the fluid-pressure cylinder.

SUMMARY OF THE INVENTION

The fluid-pressure actuator unit that lifts the blade assembly of the lawn mower to the lifted position is required to operate in two operation modes, i.e., a loaded mode in which the fluid-pressure cylinder is driven to lift the blade assembly and an unloaded mode in which the blade assembly is free to move up/down while leaving the fluid-pressure cylinder free to extend and contract. However, the operation check valve used in the prior art fluid-pressure actuator unit is structured to close when the discharge pressure of the fluid-pressure pump is low. The unloaded mode is therefore not available in the prior art fluid-pressure actuator unit.

It is therefore an object of this invention to provide a fluid-pressure actuator unit that can operate selectively in the loaded mode or in the unloaded mode in response to an operation of the fluid-pressure pump.

In order to achieve the above object, a fluid-pressure actuator unit according to this invention comprises an electric motor, a fluid-pressure pump comprising a discharge port and a suction port, which is driven by the electric motor to pressurize a working fluid suctioned via the suction port and discharge the working fluid into the discharge port in a pressurized state, a fluid-pressure cylinder, a discharge passage through which the working fluid discharged into the discharge port is supplied to the fluid-pressure cylinder to operate the fluid-pressure cylinder, a tank from which the working fluid is supplied to the suction port, a discharge flow restrictor provided in the discharge passage and a pilot-pressure-operated shut-off valve.

The pilot-pressure-operated shut-off valve may assume a connecting position at which the discharge passage between the discharge flow restrictor and the fluid-pressure cylinder is connected to the tank and a shut-off position at which the discharge passage is disconnected from the tank. The pilot-pressure-operated shut-off valve is configured to selectively assume the connecting position or the shut-off position in response to a pressure in the discharge passage between the discharge flow restrictor and the discharge port.

The details as well as other features and advantages of this invention are set forth in the remainder of the specification and are shown in the accompanying drawings.

DESCRIPTION OF THE PREFERRED EMBODIMENTS

Figure 1:
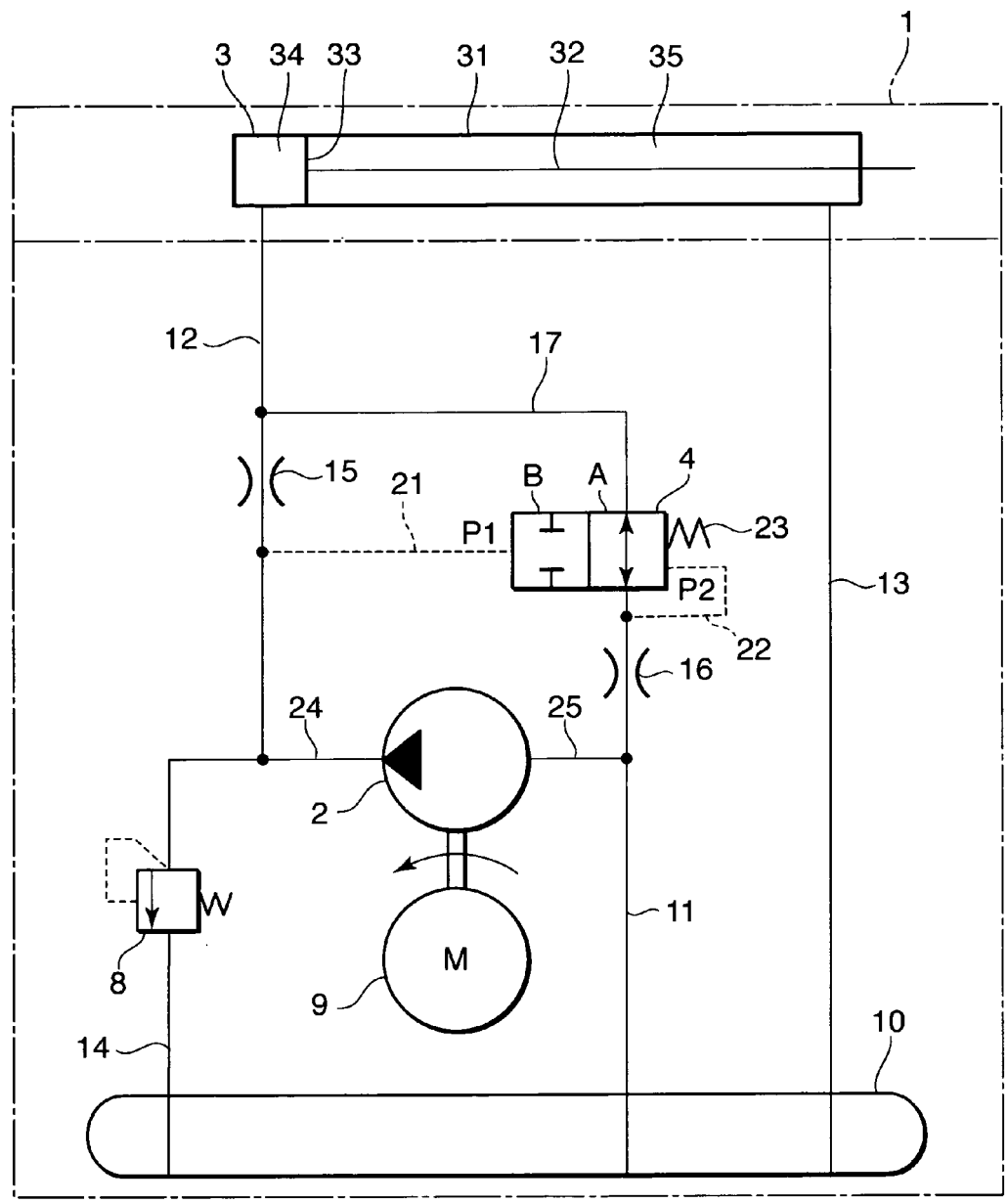
FIG. 1 is a fluid-pressure circuit diagram of a fluid-pressure actuator unit according to this invention.

Referring to FIG. 1 of the drawings, a fluid-pressure actuator unit 1 for a lawn mower according to this invention comprises a fluid-pressure pump 2 driven by an electric motor 9, a fluid-pressure cylinder 3 driven to extend by a working fluid discharged by the fluid-pressure pump 2, and a tank 10 that stores the working fluid.

The fluid-pressure pump 2 comprises a discharge port 24 and a suction port 25. In response to an operation of the electric motor 9, the fluid-pressure pump 2 suctions working fluid via the suction port 25 and discharges the working fluid into the discharge port 24 in a pressurized state.

The fluid-pressure cylinder 3 comprises a cylinder tube 31, a piston 33 accommodated in the cylinder tube 31 so as to be free to slide in an axial direction, and a piston rod 32 that is connected to the piston 33 and projects outside from the cylinder tube 31 in the axial direction. The cylinder tube 31 is filled with oil as the working fluid. The oil may be substituted, for example, by a solution of a water-soluble agent.

A bottom-side pressure chamber 34 and a rod-side pressure chamber 35 are formed by the piston 33 in the cylinder tube 31.

The bottom-side pressure chamber 34 is connected to the discharge port 24 of the fluid-pressure pump 2 via a discharge passage 12. A discharge flow restrictor 15 constituted with an orifice or a choke is provided in the discharge passage 12. The rod-side pressure chamber 35 is connected to the tank 10 via a tank passage 13.

The discharge passage 12 is connected to the tank 10 via a relief passage 14. A relief valve 8 is provided in the relief passage 14. The relief valve 8 opens at a predetermined relief pressure to recirculate the working fluid from the discharge passage 12 to the tank 10, thereby preventing the pressure in the discharge passage 12 from becoming excessively high.

The suction port 25 of the fluid-pressure pump 2 is connected to the tank 10 via a suction passage 11.

A blade assembly is supported on a vehicle body of the lawn mower so as to be free to move up/down via a floating mechanism. The fluid-pressure cylinder 3 connects either the cylinder tube 31 or the piston rod 32 to the vehicle body and conversely, connects either the piston rod 32 or the cylinder tube 31 to the blade assembly.

The fluid-pressure cylinder 3 is driven to extend by supplying the bottom-side pressure chamber 34 with working fluid discharged from the fluid-pressure pump 2, thereby lifting the blade assembly from the operating position to a predetermined lifted position in the vehicle. On the other hand, the blade assembly in the operating position moves up/down freely with respect to the vehicle body in response to an external force exerted thereon. In this state, the fluid-pressure cylinder 3 extends and contracts in synchronization with the move up/down of the blade assembly so as not to prevent the blade assembly from moving up/down.

To enable the action of the fluid-pressure actuator unit 1 described above, the fluid-pressure actuator unit 1 further comprises a pilot-pressure-operated shut-off valve 4 that selectively implements a loaded mode in which the fluid-pressure cylinder 3 lifts the blade assembly and an unloaded mode in which the fluid-pressure cylinder 3 allows the blade assembly to move up/down in response to the external force exerted thereon, as the fluid-pressure pump 2 is engaged in operation.

The pilot-pressure-operated shut-off valve 4 assumes a connecting position A in the unloaded mode or a shut-off position B in the loaded mode.

A recirculation passage 17 is connected to the discharge passage 12 between the discharge flow restrictor 15 and the bottom-side fluid-pressure chamber 34. The pilot-pressure-operated shut-off valve 4 in the connecting position A connects the recirculation passage 17 to the suction passage 11 whereas the pilot-pressure-operated shut-off valve 4 in the shut-off position B disconnects the recirculation passage 17 from the suction passage 11. A recirculation flow restrictor 16 constituted with an orifice or a choke is provided in the recirculation passage 17 between the pilot-pressure-operated shut-off valve 4 and the suction passage 11.

The pilot-pressure-operated shut-off valve 4 is biased by a pilot pressure P1 led by a first pilot pressure passage 21 towards the shut-off position B. The first pilot pressure passage 21 leads the fluid pressure in the discharge passage 12 between the discharge port 24 and the discharge flow restrictor 15 as the pilot pressure P1 to the pilot-pressure-operated shut-off valve 4. At the same time, the pilot-pressure-operated shut-off valve 4 is biased by a pilot pressure P2 led by a second pilot pressure passage 22 and a spring force of a spring 23 towards the connecting position A. The second pilot pressure passage 22 leads the fluid pressure in the recirculation passage 17 between the pilot-pressure-operated shut-off valve 4 and the recirculation flow restrictor 16 as the pilot pressure P2 to the pilot-pressure-operated shut-off valve 4.

When a differential pressure between the pilot pressures P1 and P2 does not exceed the spring force of the spring 23, the pilot-pressure-operated shut-off valve 4 remains in the connecting position A. When the differential pressure between the pilot pressures P1 and P2 exceeds the spring force of the spring 23, the pilot-pressure-operated shut-off valve 4 changes over from the connecting position A to the shut-off position B.

The blade assembly in the operating position corresponds to the unloaded mode of the fluid-pressure actuator unit 1, in which the fluid-pressure pump 2 is inoperative. As long as the fluid-pressure actuator unit 1 remains in the unloaded mode, the pilot-pressure-operated shut-off valve 4 maintains the connecting position A since the differential pressure between the pilot pressures P1 and P2 does not exceed the spring force of the spring 23.

In this state, when a compressive force is exerted on the piston rod 32 from outside, the bottom-side fluid-pressure chamber 34 contracts, and the working fluid in an amount corresponding to a contracting volume of the bottom-side fluid-pressure chamber 34 flows out therefrom to the tank 10 via the discharge passage 12, the recirculation passage 17, the pilot-pressure-operated shut-off valve 4 in the connecting position A, the recirculation flow restrictor 16, and the suction passage 11. At the same time, working fluid from the tank 10 flows into the rod-side fluid-pressure chamber 35, which undergoes expansion, via the tank passage 13.

When the fluid-pressure cylinder 3 contracts, the working fluid in the bottom-side fluid-pressure chamber 34 is returned to the tank 10 via the discharge passage 12 and the recirculation passage 17 as described above. This flow of working oil may cause the pilot pressure P1 to rise. Especially, when the bottom-side fluid-pressure chamber 34 contracts rapidly, the pilot-pressure-operated shut-off valve 4 may change over from the connecting position A to the shut-off position B due to a rapid rise in the pilot pressure P1.

In this fluid-pressure actuator unit 1, the recirculation flow restrictor 16 is provided in the recirculation passage 17 between the pilot-pressure-operated shut-off valve 4 and the suction passage 11. Owing to this arrangement, when the bottom-side fluid-pressure chamber 34 contracts rapidly and the pilot pressure P1 rises rapidly, the pilot pressure P2 upstream of the recirculation flow restrictor 16 also rises so as to prevent the pilot-pressure-operated shut-off valve 4 from changing over from the connecting position A to the shut-off position B. In this way, the recirculation flow restrictor 16 has a function to prevent the pilot-pressure-operated shut-off valve 4 from changing over from the connecting position A to the shut-off position B in the unloaded mode.

When an extending force is exerted on the piston rod 32 in the unloaded mode of the fluid-pressure actuator unit 1, the rod-side fluid-pressure chamber 35 contracts and the working fluid in an amount corresponding to a contracting volume of the rod-side fluid-pressure chamber 35 flows into the tank 10 via the tank passage 13. At the same time, the working fluid in the tank 10 flows into the bottom-side fluid-pressure chamber 34, which undergoes expansion, via the suction passage 11, the recirculation flow restrictor 16, the pilot-pressure-operated shut-off valve 4 in the connecting position A, the recirculation passage 17, and the discharge passage 12.

In the unloaded mode of the fluid-pressure actuator unit 1, in which the fluid-pressure pump 2 is inoperative, the fluid-pressure cylinder 3 extends and contracts freely in response to an external force exerted thereon, as described above. The blade assembly supported in the operating position by the fluid-pressure cylinder 3 can move up/down freely in response to an undulation in the ground surface, for example, Next, the loaded mode of the fluid-pressure actuator unit 1 will be described.

When the fluid-pressure pump 2 is activated by operating the electric motor 9, the working fluid in the tank 10 is suctioned by the fluid-pressure pump 2 through the suction passage 11 via the suction port 25, pressurized in the fluid-pressure pump 2, and then discharged into the discharge port 24. The pressurized working fluid discharged into the discharge port 24 is supplied to the bottom-side fluid-pressure chamber 34 via the discharge passage 12 so as to drive the fluid-pressure cylinder 3 to extend. When the fluid-pressure pump 2 starts to operate, the pilot-pressure-operated shut-off valve 4 is in the connecting position A so that a part of the working fluid flowing in the discharge passage 12 is returned to the tank 10 via the recirculation passage 17 and the suction passage 11.

The working fluid flowing down the discharge passage 12 causes the pressure in the upstream of the discharge flow restrictor 15, i.e., the pilot pressure P1, to rise. When the pilot pressure P1, which acts on the pilot-pressure-operated shut-off valve 4 via the first pilot pressure passage 21, exceeds the sum of the pilot pressure P2 and the spring force of the spring 23, the pilot-pressure-operated shut-off valve 4 changes over to the shut-off position B from the connecting position A. Thus, within a short time after the fluid-pressure pump 2 starts to operate, therefore, the pilot-pressure-operated shut-off valve 4 automatically changes over to the shut-off position B from the connecting position A.

Thereafter, the working fluid discharged by the fluid-pressure pump 2 is supplied exclusively to the bottom-side fluid-pressure chamber 34 via the discharge passage 12 to extend the piston rod 35, thereby lifting the blade assembly to the lifted position from the operating position. The blade assembly that has reached the lifted position is locked by a locking device. When the operation of the electric motor 9 is halted and the fluid-pressure pump 2 becomes inoperative, the blade assembly is thereby kept in the lifted position. When the pilot pressure P1 decreases due to a halt of the operation of the fluid-pressure pump 2, the pilot-pressure-operated shut-off valve 4 changes over to the connecting position A from the shut-off position B in response.

When the locking device is released in the blade assembly lifted position, the blade assembly descends to the operating position under its own weight, causing the piston rod 35 to contract. The working fluid in the bottom-side fluid-pressure chamber 34, which contracts with the contraction of the piston rod 35, flows into the tank 10 via the discharge passage 12, the recirculation passage 17, the pilot-pressure-operated shut-off valve 4 in the connecting position A, and the suction passage 11. The rod-side fluid-pressure chamber 35, which expands at this time, is charged with the working fluid from the tank 10 via the tank passage 13.

After letting the blade assembly to descend to the operating position, the fluid-pressure cylinder 3 supports the blade assembly in the operating position and extends and contracts freely so as to allow the blade assembly to move up/down in response to the external force exerted thereon.

Figure 2:
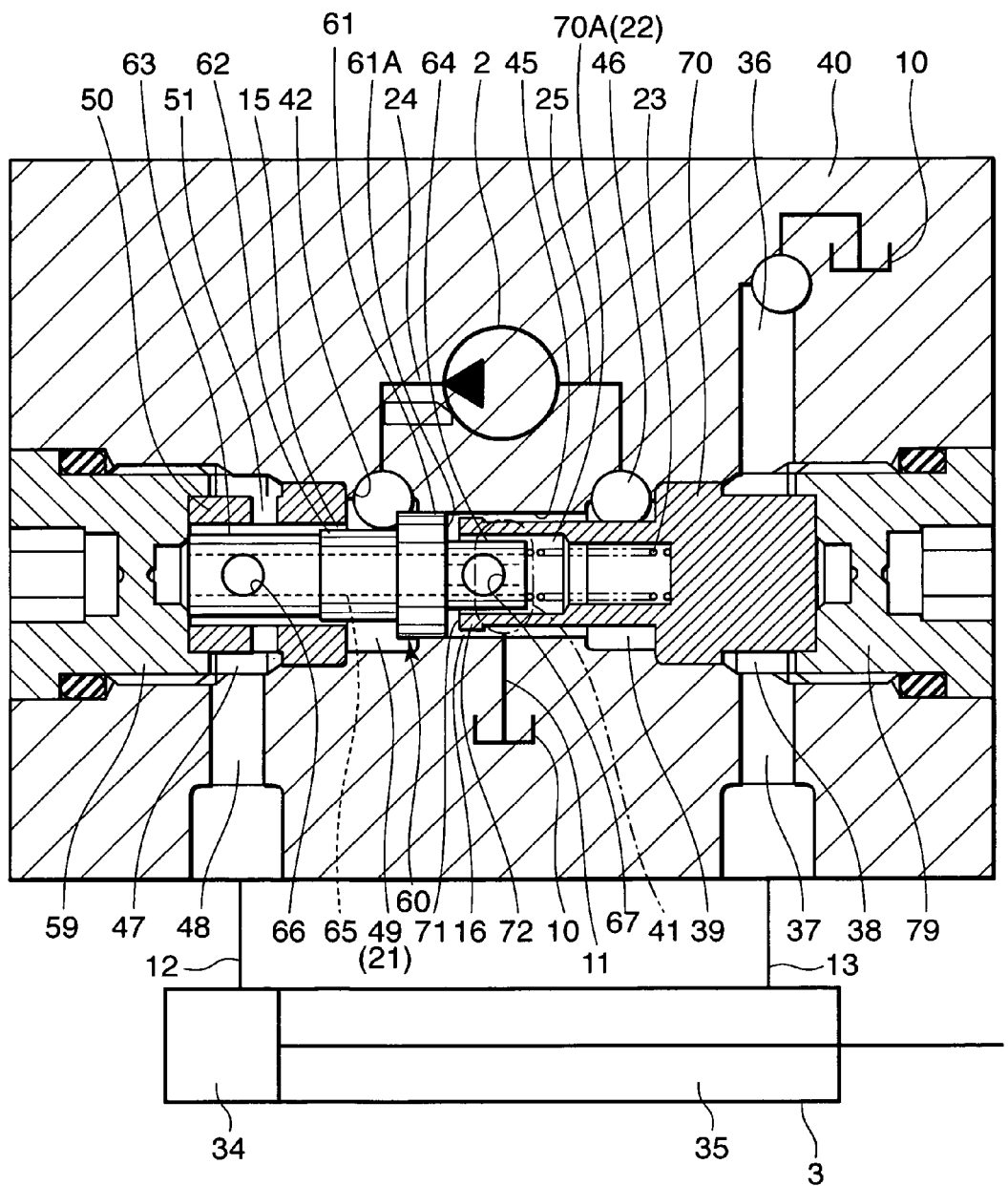
FIG. 2 is a longitudinal sectional view of a pilot-pressure-operated shut-off valve according to this invention.

Referring to FIG. 2, a construction of the pilot-pressure-operated shut-off valve 4 will be described.

The pilot-pressure-operated shut-off valve 4 comprises a spool 60 accommodated in a housing 40 so as to be free to slide axially. The spool 60 is constituted with a land part 61, a reduced diameter part 62, a tip rod 63, and a base rod 64. The land part has a largest diameter among the spool components.

A spool accommodating hole 45 is formed in the housing 40. The spool accommodating hole 45 has an inner circumferential surface on which an outer circumferential surface of the land part 61 slides axially. A tank port 4 has an opening facing a center position of the spool accommodating hole 45. The tank port 41 communicates continuously with the tank 10 via the suction passage 11.

An annular groove 39 having a greater diameter is formed in the housing 40 on the right-hand side of the spool accommodating hole 45 in the figure. A low pressure port 46 opens onto the annular groove 39. The low pressure port 46 communicates with the suction port 25 of the fluid-pressure pump 2 continuously. The suction port 25 communicates with the tank 10 continuously via the low pressure port 46, the spool accommodating hole 45, the tank port 41, and the suction passage 11.

An annular groove 49 having a greater diameter is formed in the housing 40 on the left-hand side of the spool accommodating hole 45 in the figure. A high pressure port 42 opens onto the annular groove 49. The high pressure port 42 communicates with the discharge port 24 of the fluid-pressure pump 2 continuously. The annular groove 49 functions as a first pilot pressure passage 21.

A sleeve 50 is fitted into the housing 40 on the left-hand side of the annular groove 49. The sleeve 50 is supported by a plug 59 screwed into the housing 40. The reduced diameter part 62 projects from the land part 61 to the left in the figure and the tip rod 63 projects further to the left from the reduced diameter part 62 in the figure. A diameter of the reduced diameter part 62 is set to be smaller than that of the land part 61 and a diameter of the tip rod 63 is set to be smaller than that of the reduced diameter part 62. The reduced diameter part 62 passes through the annular groove 49 and invades the sleeve 50 together with the tip rod 63. The reduced diameter part 62 and the tip rod 63 constitute a projecting portion of the spool 60.

An annular gap formed between the sleeve 50 and the reduced diameter part 62 constitutes the discharge flow restrictor 15. An annular groove 47 is formed in the housing 40 so as to surround the sleeve 50. Communicating holes 51 are formed in the sleeve 50 so as to connect the annular groove 47 with a space inside the sleeve 50.

A bottom-side port 48 connected to the annular groove 47 is formed in the housing 40. The bottom-side port 48 communicates with the bottom-side fluid-pressure chamber 34 continuously via the discharge passage 12. The discharge port 24 of the fluid-pressure pump 2 communicates with the bottom-side port 48 continuously via the discharge flow restrictor 15.

A diameter of the base rod 64 is set to be smaller than that of the land part 61. The base rod 64 projects from the land part 61 to the right in the figure. A cylindrical valve seat 70 passing through the annular groove 39 and invading the spool accommodating hole 45 is supported in the housing 40 via a plug 79 that is screwed into the housing 40. The valve seat 70 and the sleeve 50 are disposed coaxially with the spool 60. A recess 70A having an opening directed to the left in the figure is formed axially in the valve seat 70. The base rod 64 of the spool 60 invades the recess 70A while sustaining a predetermined gap thereto. The recess 70A constitutes the second pilot pressure passage 22.

A tip of the valve seat 70 faces the land part 61. An enlarged diameter part 72 having a greater outer diameter is formed on the tip of the valve seat 70. An annular gap formed between the enlarged diameter part 72 and the spool accommodating hole 45 constitutes the recirculation flow restrictor 16. A seat face 71 is formed on the tip of the enlarged diameter part 72 so that an end face 61A of the land part 61 of the spool 60 can be seated thereon. As the end face 61A of the land part 61 becomes seated on the seat face 71, the land part 61 closes an opening of the recess 70A of the valve seat 70 so that the inside and outside of the valve seat 70, i.e., the recess 70A and the annular groove formed between the valve seat 70 and the spool accommodating hole 45, are prevented from communicating.

The spring 23 is disposed between the valve seat 70 and the base rod 64.

A through-hole 65 is formed axially through the spool 60. The through-hole 65 passes through the spool 60 in an axial direction and has openings on end faces of the tip rod 63 and the base rod 64. A communicating hole 66 is formed in the tip rod 63 to connect the through-hole 65 and a space inside the sleeve 50. A communicating hole 67 is formed in the base rod 64 to connect the through-hole 65 and the recess 70A. The communicating hole 66, the through-hole 65, and the communicating hole 67 constitute the recirculation passage 17 shown in FIG. 1.

In a state in which the land part 61 is lifted from the seat face 71 at the tip of the valve seat 70 as shown in FIG. 2, the spool 60 causes the recirculation passage 17 to communicate with the tank 10 via the recirculation flow restrictor 16 and the suction passage 11. This state corresponds to the connecting position A shown in FIG. 1. On the other hand, in a state in which the land part 61 causes the end face 61A to be seated on the seat face 71A, a flow path between the recirculation passage 17 and the recirculation flow restrictor 16 is shut off. This state corresponds to the shut-off position B shown in FIG. 1.

When the fluid-pressure pump 2 is operating, a pressurized working fluid in the high pressure port 42 supplied from the discharge port 24 flows through the discharge passage 12 and the discharge flow restrictor 15 to the bottom-side fluid-pressure chamber 34. Through the working fluid flow, a pressure in the annular groove 49 on the upstream side of the discharge flow restrictor 15 is taken as the pilot pressure P1 and exerted on the land part 61 of the spool 60 toward the right in FIG. 2.

At the same time, a pressure in the recirculation passage 17 on the upstream side of the recirculation flow restrictor 16 is taken as the pilot pressure P2 and exerted at the recess 70A of the valve seat 70 so as to bias the end face of the base rod 64 and the end face 61A of the land part 61 of the spool 60 to the left in the figure, i.e., in the same direction as the spring force of the spring 23.

The spool 60 is displaced in correspondence to a balance point between the pilot pressure P1 biasing the spool 60 to the right in the figure and the sum of the spring force of the spring 23 and the pilot pressure P2 biasing the spool to the left in the figure. The displacement of the spool 60 in the left-hand direction is limited by the tip rod 63 when it comes into contact with the plug 59. The displacement of the spool 60 in the right-hand direction is limited by the end face 61A thereof when it is seated on the seat face 71 of the valve seat 70.

An annular passage 38 is formed in the housing 40 so as to face an outer circumference of a base of the valve seat 70. The annular passage 38 connects a tank-side port 36 and a rod-side port 37 both formed in the valve housing 40. The tank-side port 36 is connected to the tank 10 continuously and the rod-side port 37 is connected to the rod-side pressure chamber 35 of the fluid-pressure cylinder 3 continuously. The tank-side port 36, the annular passage 38, and the rod-side port 37 constitute the tank passage 13.

Although the tank-side port 36, the rod-side port 37, and the annular passage 38 are formed in the valve housing 40 for convenience in this embodiment, they are not components of the pilot-pressure-operated shut-off valve 4 but rather, they are the components of the tank passage 13 that is independent of the pilot-pressure-operated shut-off valve 4.

Figure 3:
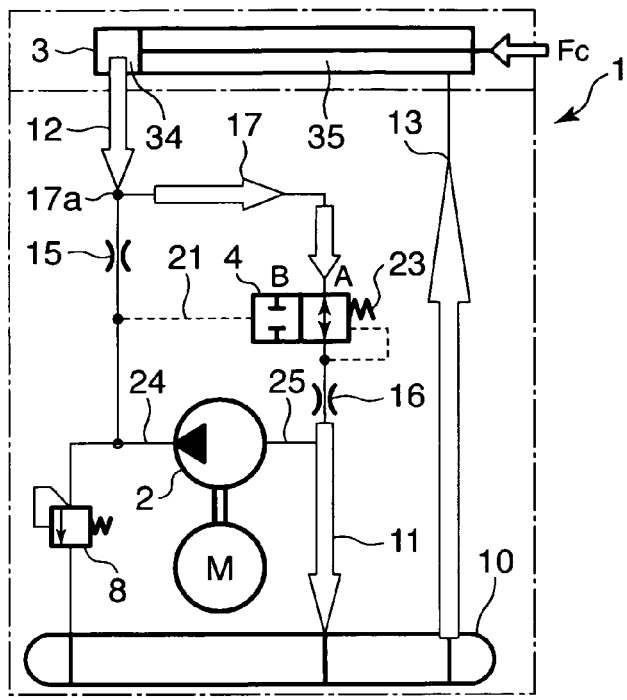
FIG. 3 is a fluid-pressure circuit diagram of the fluid-pressure actuator unit in an unloaded mode, showing a working fluid flow when a fluid-pressure cylinder contracts.
Figure 4:
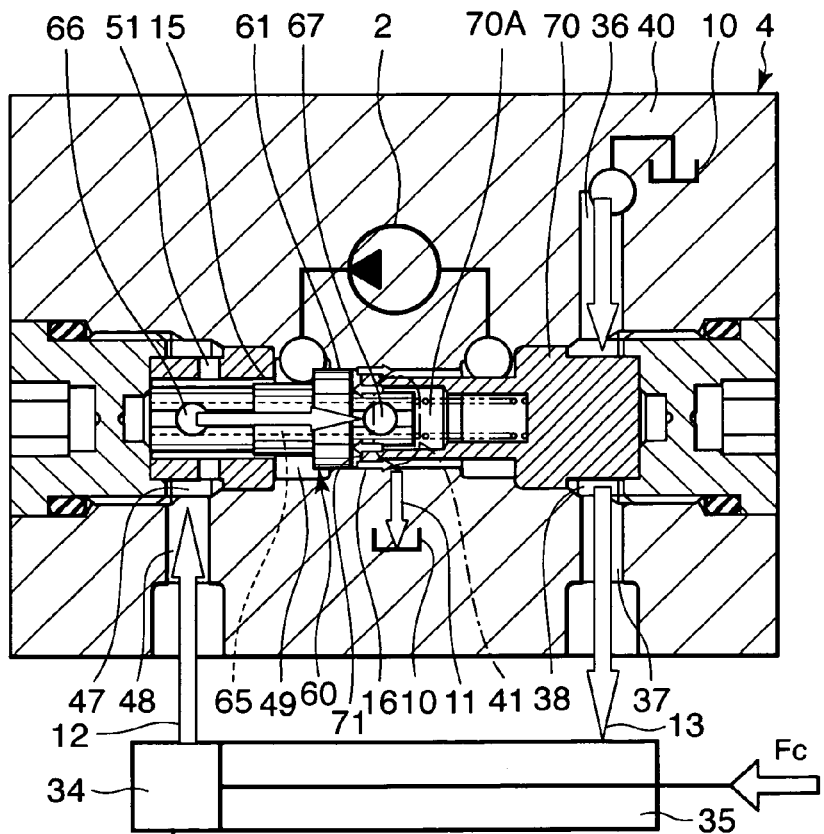
FIG. 4 is an enlarged longitudinal sectional view of essential parts of the pilot-pressure-operated shut-off valve in a connecting position, showing the working fluid flow when the fluid-pressure cylinder contracts.

Referring to FIGS. 3 and 4, a working fluid flow in the fluid-pressure actuator unit 1 when the fluid-pressure cylinder 3 undergoes contraction due to an external force Fc when the fluid-pressure pump 2 is inoperative, i.e., the fluid-pressure actuator unit 1 is in the unloaded mode, will be described.

Referring to FIG. 4, the pilot-pressure-operated shut-off valve 4 keeps the land part 61 of the spool 60 in a lifted position from the seat face 71 of the valve seat 70, since the pilot pressure P1 is low while the fluid-pressure pump 2 is in the inoperative state. In other words, the pilot-pressure-operated shut-off valve 4 holds the connecting position A.

Referring to FIG. 3, when the external force Fc acts on the fluid-pressure cylinder 3 in the direction for contracting in a state in which the pilot-pressure-operated shut-off valve 4 is in the connecting position A, the bottom-side fluid-pressure chamber 34 contracts and the working fluid in the bottom-side fluid-pressure chamber 34 flows into the tank 10 via the discharge passage 12, the recirculation passage 17, the pilot-pressure-operated shut-off valve 4, and the suction passage 11.

Referring again to FIG. 4, in the pilot-pressure-operated shut-off valve 4, the working fluid flows into the bottom-side port 48 from the discharge passage 12, reaches the recess 70A on the inside of the valve seat 70 via the annular groove 47, the communicating holes 51, the communicating hole 66, the through-hole 65, and the communicating hole 67, and flows out to the suction passage 11 via a gap between the land part 61 in the lifted position and the seat face 71 of the valve seat 70, the recirculation flow restrictor 16, and the tank port 41.

The working fluid in the tank 10 flows into the rod-side fluid-pressure chamber 35, which undergoes expansion, via the tank passage 13 including the tank-side port 36, the annular passage 38, and the rod-side port 37.

When the fluid-pressure cylinder 3 contracts in the unloaded mode, the working oil in the bottom-side fluid-pressure chamber 34 is thus returned to the tank 10 via the recirculation flow restrictor 16. Accordingly, the pilot pressure P2 in the recess 70A, which is located on the upstream side of the recirculation flow restrictor 16, is maintained at a substantially equal pressure level as the pilot pressure P1, which is led to the annular groove 49 via the discharge flow restrictor 15, irrespective of a contraction speed of the fluid-pressure cylinder 3, As a result, The sum of the spring force of the spring 23 and the pilot pressure P2 exceeds the pilot pressure P1 so that the pilot-pressure-operated shut-off valve 4 is reliably held in the connecting position A.

Figure 5:
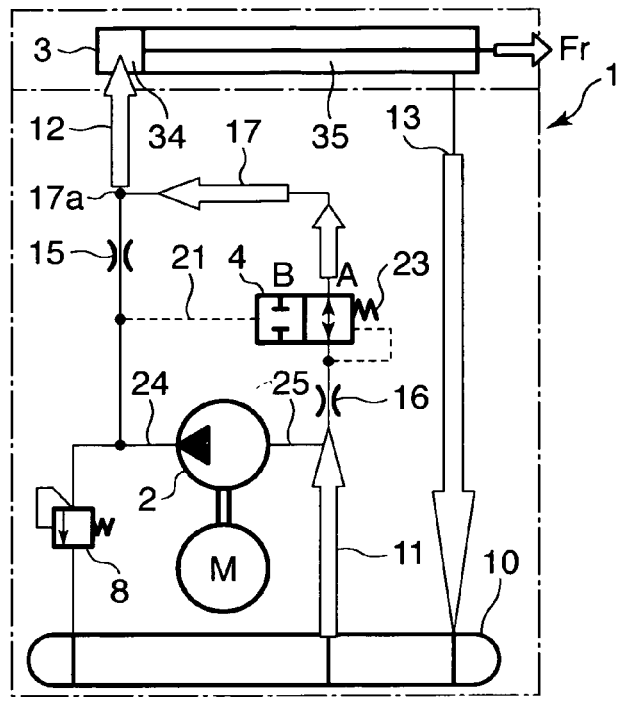
FIG. 5 is a fluid-pressure circuit diagram of the fluid-pressure actuator unit in an unloaded mode, showing a working fluid flow when the fluid-pressure cylinder extends.
Figure 6:
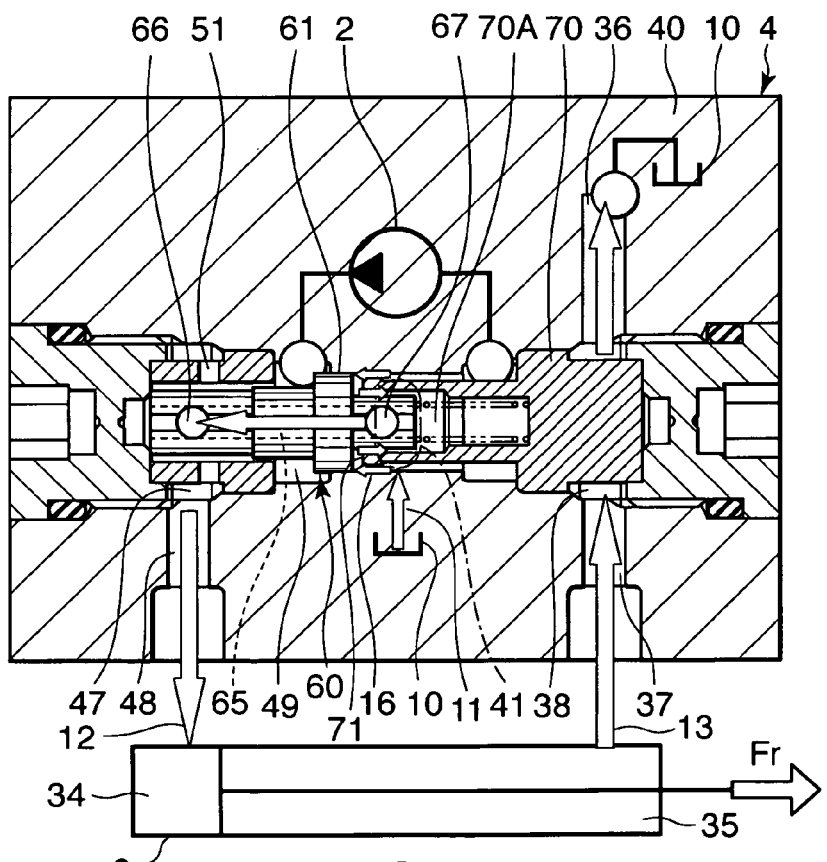
FIG. 6 is an enlarged longitudinal sectional view of essential parts of the pilot-pressure-operated shut-off valve in the connecting position, showing the working fluid flow when the fluid-pressure cylinder extends.

Referring to FIGS. 5 and 6, a working fluid flow in the fluid-pressure actuator unit 1 when the fluid-pressure cylinder 3 undergoes extension due to an external force Fr when the fluid-pressure pump 2 is in the inoperative state, i.e., when the fluid-pressure actuator unit 1 is in the unloaded mode, will be described.

In the state shown in FIG. 6, too, the pilot pressure P1 is low, and thus, the pilot-pressure-operated shut-off valve 4 keeps the land part 61 of the spool 60 in the lifted position from the seat face 71 of the valve seat 70. In other words, the pilot-pressure-operated shut-off valve 4 is held in the connecting position A.

Referring to FIG. 5, when the external force Fr acts on the fluid-pressure cylinder 3 in the direction for extending in a state in which the pilot-pressure-operated shut-off valve 4 is held in the connecting position A, the rod-side fluid-pressure chamber 35 contracts and the working fluid in the rod-side fluid-pressure chamber 35 flows into the tank 10 via the tank passage 13 including the rod-side port 37, the annular passage 38 and the tank-side port 36.

The working fluid in the tank 10 flows into the bottom-side fluid-pressure chamber 34, which undergoes expansion, via the suction passage 11, the recirculation flow restrictor 16, the pilot-pressure-operated shut-off valve 4 in the connecting position A, the recirculation passage 17, and the discharge passage 12.

Referring again to FIG. 6, in the pilot-pressure-operated shut-off valve 4, the working fluid flows into the tank port 41 from the suction passage 11, reaches the discharge passage 12 via the communicating hole 67, the through-hole 65, the communicating hole 66, the communicating holes 51, the annular groove 47, and the bottom-side port 48.

When the fluid-pressure cylinder 3 extends or contracts the fluid-pressure actuator unit 1 in the unloaded mode, the pressures in the second pilot pressure passage 22 and the first pilot passage 21 are both low. In this case, therefore, the pilot-pressure-operated shut-off valve 4 is held in the connecting position A by the spring force of the spring 23.

Figure 7:
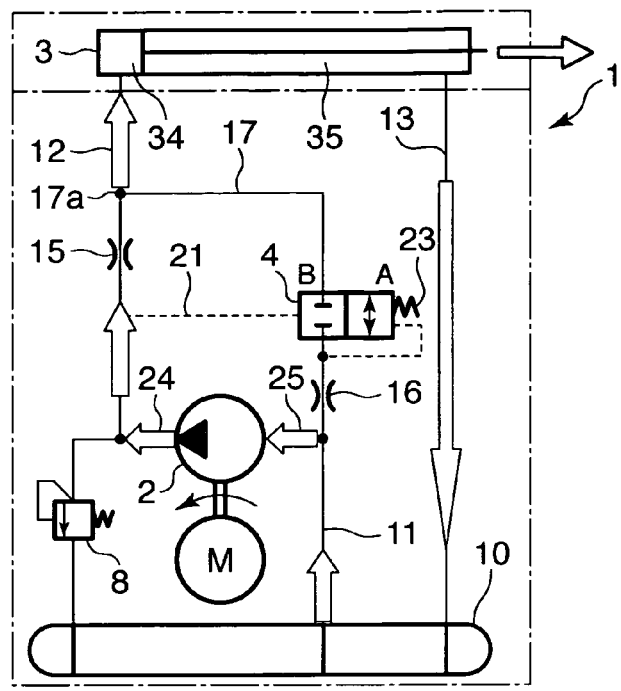
FIG. 7 is a fluid-pressure circuit diagram of the fluid-pressure actuator unit in a loaded mode, showing a working fluid flow when the fluid-pressure cylinder is driven to extend.
Figure 8:
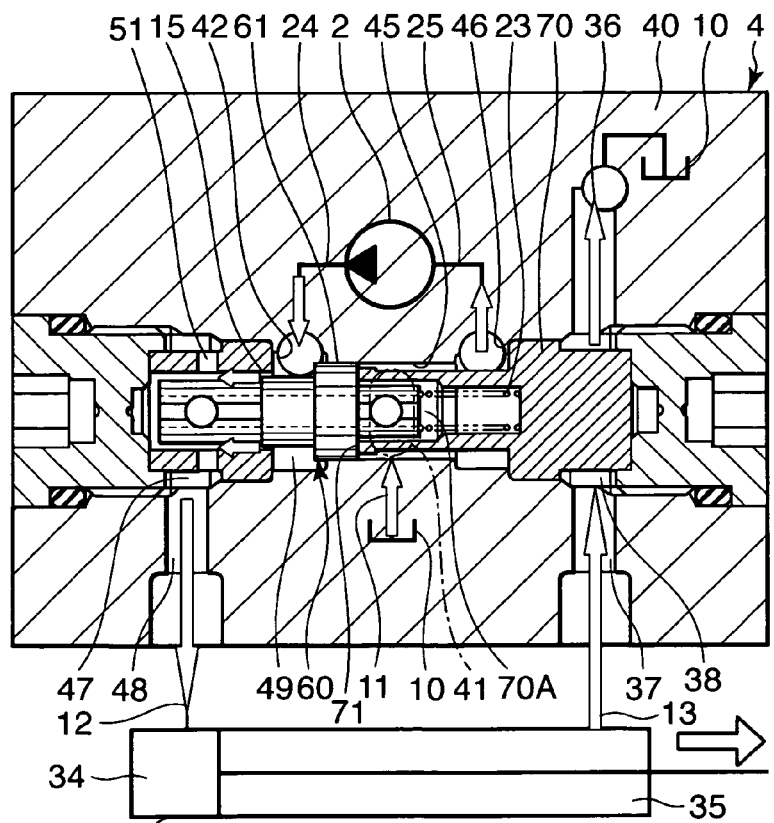
FIG. 8 is a longitudinal sectional view of the pilot-pressure-operated shut-off valve in a shut-off position, showing the working fluid flow when the fluid-pressure cylinder is driven to extend.

Referring to FIGS. 7 and 8, a working fluid flow in the fluid-pressure actuator unit 1 when the fluid-pressure pump 2 is in an operative state, i.e., when the fluid-pressure actuator unit 1 is in the loaded mode, will be described.

Referring to FIG. 7, when the fluid-pressure pump 2 is operative, the working fluid in the tank 10 is suctioned into the fluid-pressure pump 2 from the suction passage 11 via the suction port 25. The fluid-pressure pump 2 pressurizes the suctioned working fluid and discharges it into the discharge port 24. The pressurized working fluid in the discharge port 24 is supplied to the bottom-side fluid-pressure chamber 34 via the discharge flow restrictor 15 and the discharge passage 12. As a result, the bottom-side fluid-pressure chamber 34 expands, and causes the piston rod 32 via the piston 33 to extend so that the blade assembly is lifted from the operating position to the lifted position.

When the fluid-pressure pump 2 starts to operate, the pilot-pressure-operated shut-off valve 4 is held in the connecting position A. Accordingly, when the fluid-pressure pump 2 starts to operate, a part of the working fluid in the discharge passage 12 is returned through the recirculation passage 17 to the tank 10 via the pilot-pressure-operated shut-off valve 4, the recirculation flow restrictor 16, and the suction passage 11. At the same time, the pressure in the discharge passage 12 on the upstream side of the discharge flow restrictor 15 rises due to the discharged working fluid from the fluid-pressure pump 2. As a result, the pilot pressure P1 acting on the pilot-pressure-operated shut-off valve 4 via the first pilot pressure passage 21 rises so that the pilot-pressure-operated shut-off valve 4 changes over to the shut-off position B from the connecting position A.

Referring to FIG. 8, in the pilot-pressure-operated shut-off valve 4, the working fluid flows out from the discharge port 24 to the discharge passage 12 via the high pressure port 42, the discharge flow restrictor 15, the communicating holes 51, the annular groove 47, and the bottom-side port 48. Through this working fluid flow, the pilot pressure P1 is applied to the land part 61 of the spool 60 in the annular groove 49 on the upstream side of the discharge flow restrictor 15 so as to cause the end face 61A of the land part 61 to become seated on the valve seat 70. As the land part 61 becomes seated on the valve seat 70, the flow path connecting the recirculation passage 17 and the recirculation flow restrictor 16 is shut-off. The pilot-pressure-operated shut-off valve 4 is thus changed over from the connecting position A to the shut-off position B.

Once the pilot-pressure-operated shut-off valve 4 has changed over to the shut-off position B, the discharged working fluid from the fluid-pressure pump 2 is supplied in its entirety to the bottom-side fluid-pressure chamber 34 via the discharge passage 12. In response to a displacement of the piston 33 due to the expansion of the bottom-side fluid-pressure chamber 34, the rod-side fluid-pressure chamber 35 undergoes contraction so that the working fluid in the rod-side fluid-pressure chamber 35 flows into the tank 10 via the tank passage 13.

As described above, in this fluid-pressure actuator unit 1, the pilot-pressure-operated shut-off valve 4 changes over in response to a pressure in the discharge passage 12. As a result, the loaded mode in which the fluid-pressure cylinder 3 is driven to extend or contract and the unloaded mode in which the fluid-pressure cylinder 3 extends and contracts according to an external force exerted thereon can be changed over automatically in response to an operation and an operation stop of the fluid-pressure pump 2 without requiring a change-over operation by an operator.

In this fluid-pressure actuator unit 1, when the fluid-pressure cylinder 3 contracts in the unloaded mode, the working fluid in the bottom-side fluid-pressure chamber 34 returns to the tank 10 via the recirculation flow restrictor 16. The second pilot pressure P2 between the recirculation flow restrictor 16 and the pilot-pressure-operated shut-off valve 4 is maintained substantially equal to the first pilot pressure P1 led to the annular groove 49 via the discharge flow restrictor 15. Accordingly, the sum of the spring force of the spring 23 and the pilot pressure P2 always exceeds the pilot pressure P1 in the unloaded mode so that the pilot-pressure-operated shut-off valve 4 is reliably held in the connecting position A.

In this fluid-pressure actuator unit 1, since the spool 60, the sleeve 50, and the valve seat 70 are disposed coaxially, the pilot-pressure-operated shut-off valve 4 can be made small in size.

The contents of Tokugan 2009-241187, with a filing date of Oct. 20, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiment described above, the blade assembly is lifted to the lifted position as the fluid-pressure cylinder 3 is driven to extend by supplying the working fluid discharged from the fluid-pressure pump 2 to the bottom-side pressure chamber 34. As an alternative, the blade assembly may be lifted to the lifted position by driving the fluid-pressure cylinder 3 to contract by supplying the working fluid discharged from the fluid-pressure pump 2 to the rod-side pressure chamber 35. In this case, the bottom-side pressure chamber 34 will be connected to the tank 10 via the tank passage 13 and the rod-side pressure chamber 35 will be supplied with the working fluid discharged from the fluid-pressure pump 2 via the discharge passage 12. The pilot-pressure-operated shut-off valve 4 will connect or disconnect the recirculation passage 17 depending on the discharge pressure of the fluid-pressure pump 2 as in the case of the embodiment described above.

In the embodiment described above, the fluid-pressure cylinder 3 is constituted by a piston cylinder having the piston 33. It is also possible to constitute the fluid-pressure cylinder 3 with a ram cylinder that does not have the piston 33. The ram cylinder would have a single fluid-pressure chamber in the cylinder tube and would not have a rod-side pressure chamber 35. By using a ram cylinder as the fluid-pressure cylinder 3, the tank passage 13 can be omitted. However, from the viewpoint of ensuring a pressure receiving area with respect to the working fluid discharged by the fluid-pressure pump 2, a piston cylinder is generally preferred to a ram cylinder.

In the embodiment described above, the fluid-pressure actuator unit 1 is adopted in a lawn mower, but the fluid-pressure actuator unit 1 according to this invention can be adopted in various machines and devices other than a lawn mower.

The embodiments of this invention in which an exclusive property or privilege is claimed are defined as follows:

What is claimed is:

1. A fluid-pressure actuator unit comprising:
   an electric motor;
   a fluid-pressure pump comprising a discharge port and a suction port, which is driven by the electric motor to pressurize a working fluid suctioned via the suction port and discharge the working fluid into the discharge port in a pressurized state;
   a fluid pressure cylinder;
   a discharge passage through which the working fluid discharged into the discharge port is supplied to the fluid pressure cylinder to operate the fluid pressure cylinder;
   a tank from which the working fluid is supplied to the suction port;
   a discharge flow restrictor disposed in the discharge passage;
   a pilot-pressure-operated shut-off valve that assumes a connecting position at which the discharge passage between the discharge flow restrictor and the fluid-pressure cylinder is connected to the tank and a shut-off position at which the discharge passage is disconnected from the tank, with the connecting position or the shut-off position selected in response to a pressure in the discharge passage between the discharge flow restrictor and the discharge port,
   a recirculation passage that connects the discharge passage between the discharge flow restrictor and the fluid-pressure cylinder to the tank via the pilot-pressure-operated shut-off valve in the connecting position; and
   a recirculation flow restrictor disposed in the recirculation passage between the pilot-pressure-operated shut-off valve and the tank,
   wherein the pilot-pressure-operated shut-off valve is configured to selectively assume the connecting position or the shut-off position in accordance with a differential pressure between a pressure in the discharge passage between the discharge flow restrictor and the discharge port and a pressure in the recirculation passage between the pilot-pressure-operated shut-off valve and the recirculation flow restrictor.

2. The fluid-pressure actuator unit as defined in claim 1, wherein the pilot-pressure-operated shut-off valve is configured to maintain the connecting position when the differential pressure is not greater than a predetermined pressure and change over from the connecting position to the shut-off position when the differential pressure becomes greater than the predetermined pressure.

3. The fluid-pressure actuator unit as defined in claim 2, wherein the pilot-pressure-operated shut-off valve comprises:
   a spool accommodating hole;
   a spool accommodated in the spool accommodating hole; and
   a cylindrical valve seat that is disposed in the spool accommodating hole so as to face the spool, which includes a seat face facing the spool,
   wherein:
   the connecting position corresponds to a spool position assumed by the spool when the spool is lifted from the seat face so as to connect an inner space and an outer space of the cylindrical valve seat, and the shut-off position corresponds to a spool position assumed by the spool when the spool is seated on the seat face so as to disconnect the inner space and the outer space of the cylindrical valve seat.

4. The fluid-pressure actuator unit as defined in claim 3, wherein the pilot-pressure-operated shut-off valve further comprises a spring that biases the spool in a direction for lifting the spool from the seat face of the valve seat.

5. The fluid-pressure actuator unit as defined in claim 3, wherein:
   the spool comprises a land part having an outer circumferential surface that slides on an inner circumferential surface of the spool accommodating hole and an end face that comes into contact with the seat face, a base rod projecting from the land part into the valve seat, and a projecting portion projecting from the land part in an axially opposite direction to the base rod;
   the pilot-pressure-operated shut-off valve comprises a sleeve that accommodates the projecting portion;
   the discharge passage is formed through an annular gap that is formed between an inner circumferential surface of the sleeve and an outer circumferential surface of the projecting portion; and
   the discharge flow restrictor is configured to narrow a flow sectional area of the annular gap.

6. The fluid-pressure actuator unit as defined in claim 5, wherein:
   the pilot-pressure-operated shut-off valve has an annular groove through which the pressure in the discharge passage between the discharge flow restrictor and the discharge port is applied to the land part;
   the valve seat has a recess that accommodates the base rod; and
   the pressure in the recirculation passage between the pilot-pressure-operated shut-off valve and the recirculation flow restrictor is led to the recess.

7. The fluid-pressure actuator unit as defined in claim 6, wherein the spool has an axial through-hole connecting the recess and the discharge passage.

8. The fluid-pressure actuator unit as defined in claim 3, wherein the recirculation passage is formed though a second annular gap formed between an outer circumferential surface of the valve seat and the inner circumferential surface of the accommodating hole, and the recirculation flow restrictor is formed by reducing the flow sectional area of the second annular groove.

9. The fluid-pressure actuator unit as defined in claim 1, wherein the discharge flow restrictor and the recirculation flow restrictor are each constituted with an orifice or a choke.

* * * * *